Patented June 3, 1930

1,761,813

UNITED STATES PATENT OFFICE

HERMAN ALEXANDER BRUSON, OF PHILADELPHIA, PENNSYLVANIA, ASSIGNOR TO THE RESINOUS PRODUCTS & CHEMICAL COMPANY, A CORPORATION OF DELAWARE

SOFTENER FOR CELLULOSE DERIVATIVES

No Drawing. Original application filed October 8, 1928, Serial No. 311,256. Divided and this application filed January 18, 1929. Serial No. 333,525.

As previously disclosed in my co-pending application bearing Serial No. 311,256, filed Oct. 8, 1928 (of which this case is a division), the soluble, plastic condensation products made by heating polyhydric alcohols such as glycerol, with dibasic acids containing six or more carbon atoms in a normal straight chain, such as adipic acid or its higher homologues, possess the important property of being readily compatible with nitro-cellulose, and of yielding transparent, flexible films in conjunction therewith.

Now I have found that such cellulosic films possess certain physical properties which are desirable in coatings for porous substances such as leather, woven fabrics, paper, rubber, and the like, where flexibility, elasticity, and resistance to oils are essential.

In the past, films of nitro-cellulose or of other cellulose derivatives have been made flexible by incorporating therewith softening agents such as castor oil, or plasticizers such as tricresyl phosphate, dibutyl phthalate, and other high boiling liquids generally recognized in the art. These liquids are, for the most part, soluble in oils or hydrocarbons and are readily absorbed by porous materials, notably leather. For this reason, nitro-cellulose films containing such liquids gradually lose their flexibility when applied to leather, and form an embrittled, discontinuous film. If excessive quantities of softening agents, such as castor oil for example, are used, there is a tendency for the latter to separate or "spew out" from the film on storage.

I have found that these difficulties may be overcome, and flexible, elastic films of nitro-cellulose obtained, which do not spew out, and which show greater adhesion and less penetration, by mixing the nitro-cellulose or other cellulose derivative with the soluble, condensation products that are obtained by heating polyhydric alcohols with adipic acid or its higher homologues. The films which are obtained by combining nitro-cellulose with the condensation product of glycerol and sebacic acid for example have been found to be particularly useful as coatings for leather since a flexible, continuous film is obtained that adheres well and is elastic. The method of practicing my invention may be briefly described as follows:

The soluble, rubber-like condensation product which is prepared by heating 1½ mole equivalents of sebacic acid with 1 mole equivalent glyceral for 3–4½ hours at 165–170° C. is dissolved in butyl acetate or other nitro-cellulose solvent and mixed with a solution of nitro-cellulose. Depending upon the relative amounts of sebacic acid-glycerol condensation product and nitro-cellulose, a clear film is obtained upon evaporation of the solvent which possesses varying degrees of flexibility and elasticity. One part of sebacic acid-glycerol condensation product to one part of dry nitro-cellulose gives an exceedingly flexible and elastic, clear film. The proportion of condensation product may be increased to give still more flexible films which are extremely elastic.

When this composition is applied to leather, paper, or other porous material, a continuous nitro-cellulose film is obtained upon evaporation which shows greater adhesion than similar films prepared with castor oil. Moreover, the films are oil resistant and may be left in contact with oils or hydrocarbons without loss of the softening agent. These films can find use as dressings for leather, paper, fabrics and the like, or as surface coatings for rubber where protection against oils is desired, or for preparing flexible photographic films.

The condensation products which may be used as plastic softeners for this purpose are not limited to those of glycerol and sebacic acid, but may include any of the soluble products that are formed by heating glycerol, polyglycerol, or other polyhydric alcohol, with dibasic acids that contain at least six carbon atoms in a norml straight chain, namely, adipic, pimelic, suberic, and azelaic acids, or mixtures of these, as enumerated and described in the aforementioned co-pending application Serial No. 311,256.

Furthermore, cellulose acetate or other cellulose derivatives which are soluble in organic solvents that are also capable of dissolving the plastic condensation product itself, may be used in lieu of nitro-cellulose. Other softening agents such as castor oil may also be added to the above mentioned flexible films, if desired.

Having described this invention and a method by which it may be practiced, I therefore claim the following:

1. A composition of matter containing nitro-cellulose and a condensation product of sebacic acid and glycerol.

2. A composition consisting of a cellulose derivative plasticized with a condensation product of sebacic acid and a polyhydric alcohol.

3. Composition consisting of a cellulose derivative plasticized with a condensation product of a polyhydric alcohol and an aliphatic dibacic acid of the homologous series, adipic, pimelic, suberic, azelaic and sebacic.

4. Composition consisting of nitrocellulose plasticized with a condensation product of a polyhydric alcohol and an aliphatic dibasic acid of the homologous series, adipic, pimelic, suberic, azelaic and sebacic.

5. Composition consisting of nitrocellulose plasticized with a condensation product of sebacic acid and glycerol.

6. Composition of matter containing a cellulose derivative and a condensation product of sebacic acid and glycerol.

HERMAN ALEXANDER BRUSON.